Jan. 27, 1942.  W. J. WISNIEWSKI  2,270,986
WHEEL BRAKE ADJUSTER
Filed Sept. 28, 1940  2 Sheets-Sheet 1

INVENTOR.
William Joseph Wisniewski
BY

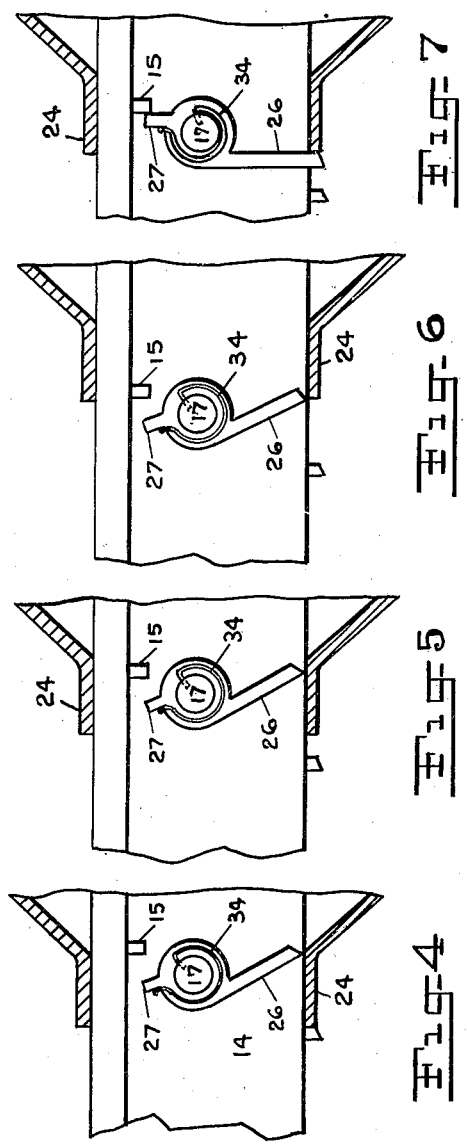

Patented Jan. 27, 1942

2,270,986

UNITED STATES PATENT OFFICE 2,270,986

WHEEL BRAKE ADJUSTER

William Joseph Wisniewski, Bayonne, N. J.

Application September 28, 1940, Serial No. 358,901

2 Claims. (Cl. 188—79.5)

This invention relates to a device for adjusting the braking mechanism of a wheel brake, and is directed to means for adjusting the braking mechanism as the lining wears. A further object of this invention is to provide a compact and durable adjusting mechanism, which shall be inexpensive to manufacture and efficient in use.

Figure 1:
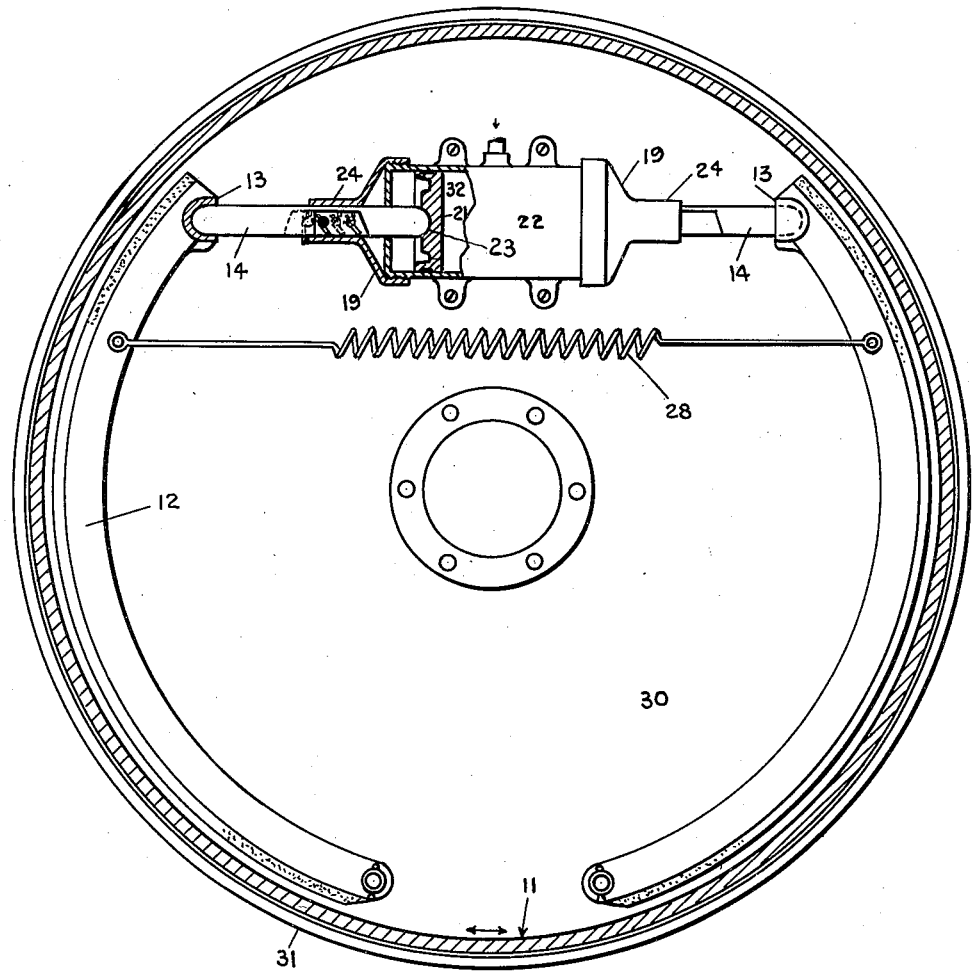
Figures 2, 3:
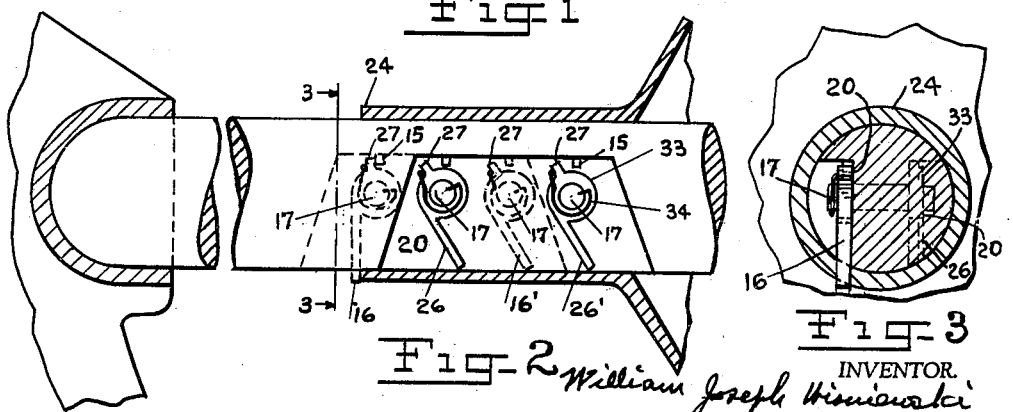

In the accompanying drawings, I have illustrated an embodiment of the invention. Fig. 1 is a side elevation view partly in section of a hydraulic brake mechanism embodying the invention. Fig. 2 is an enlarged view partly in section and partly broken away illustrating the take-up mechanism. Fig. 3 is a cross-section on the line 3—3 of Fig. 2. Figs. 4 to 7 inclusive are enlarged detail views showing the several stages of operation of the take-up mechanism.

Secured on the back plate 30 of a wheel brake, between the separate ends of the shoes 12 is a motor cylinder 22, which may be suitably connected to a conventional fluid pressure system. The cylinder has therein corresponding reciprocable pistons 21, arranged in oppositely disposed relation. Dust caps 19 having sleeve hubs 24 are fitted to the outer ends of said cylinder.

The ends of aligned stems 14 are received by the recesses 23 of said pistons, and the other ends are seated in yokes 13 carried in recesses of the flange portion of the shoes 12. A plurality of shafts 17 have a plurality of arms 16, 16' and 26, 26' rotatably mounted thereon. These arms project laterally from recesses 20, disposed at opposite sides of the stems 14. The springs 34 on the shafts, each have one of their ends fitted to said shafts and the other ends bearing against the shorter ends 27 of the arms. A plurality of shoulders 15 also extend radially into the recesses of said stems 14. In operation, the arms 16, 16' or 26, 26' are first positioned on the inside of the hubs 24 of the dust caps 19 secured to the cylinder 22. Upon the introduction of the fluid under pressure, the pistons 21 are moved in opposite directions, said movement being transmitted thru the stems 14 to the shoes 12 to spread them into engagement with the brake drum 31. Should the lining 11 of the drum be worn down sufficiently as to permit the arm 16 to clear the hub 24, the spring 34 will then rotate the arm until clear of tube 24, and the further rotation of said arm will be prevented by the engaging the shoulder 15. Upon the release of the pressure the retractor spring 28 will return the shoe, thereby returning the stem 14, and the further return of said stem 14 will be prevented by the arm 16 engaging the end of the hub 24, thus positioning the shoe to a new adjustment and taking up for the wear.

The adjusting mechanism of which the above is illustrative, can be incorporated as an adjusting unit in hydraulic, air or other types of brakes for vehicles or other devices.

As various embodiments may be made of the invention, it is to be understood that the matter herein set forth or shown in the accompanying drawings is to be interpreted as illustrative only and not in a limiting sense.

Having thus described my invention, I claim as new and desire to secure by Letters Patent:

1. In a brake adjusting mechanism of the character described, a pair of shoes pivoted at adjacent ends, hydraulic controlling means between the opposite ends of said shoes, plungers between said means and said shoes, and means for adjusting the projection of said plungers as said brake wears, said last mentioned means comprising fingers upon said plungers and housings around the same, said fingers being adapted to prevent the return of said plungers within said housings when said brakes are worn and adapted upon occurrence of brake shoe wear, to successively travel with the plungers outwardly of the housings, and then abut against the outer ends of said housings upon release of the brake shoe, whereby to determine the adjusted position thereof.

2. In a brake adjusting mechanism of the character described, a pair of shoes pivoted at adjacent ends, hydraulic controlling means between the opposite ends of said shoes, plungers between said means and said shoes, and means for adjusting the projection of said plungers as said brake wears, said last mentioned means comprising fingers upon said plungers and housings around the same, said fingers being adapted to prevent the return of said plungers within said housings when said brakes are worn, said plungers recessed at opposite sides for the reception of said fingers, extensions from said fingers, and stops projecting into said recesses in the path of movement of said extensions to prevent said fingers from traveling back into said housings after being projected therefrom.

WILLIAM JOSEPH WISNIEWSKI.